US010149137B2

(12) United States Patent
Li et al.

(10) Patent No.: US 10,149,137 B2
(45) Date of Patent: Dec. 4, 2018

(54) ENHANCED COMMUNICATION SYSTEM

(71) Applicant: International Business Machines Corporation, Armonk, NY (US)

(72) Inventors: Shuang Li, Beijing (CN); Hai Lei Song, Beijing (CN); Yun Ting Wang, Beijing (CN); Guang Ming Zhang, Beijing (CN); Zhao Hui Zhong, Beijing (CN); Pu Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 14/862,215

(22) Filed: Sep. 23, 2015

(65) Prior Publication Data

US 2017/0086234 A1    Mar. 23, 2017

(51) Int. Cl.
*H04W 8/00*     (2009.01)
*H04W 76/14*    (2018.01)
(Continued)

(52) U.S. Cl.
CPC .......... *H04W 8/005* (2013.01); *H04W 76/14* (2018.02); *G06K 9/325* (2013.01); *H04W 4/80* (2018.02)

(58) Field of Classification Search
CPC . H04W 76/021; H04W 76/023; H04W 8/005; H04W 76/14; H04W 4/80;
(Continued)

(56) References Cited

U.S. PATENT DOCUMENTS 8,130,092 B2    3/2012  Shiraki
8,234,057 B2    7/2012  Shiraki et al.
(Continued)

FOREIGN PATENT DOCUMENTS

KR    1020120056631 A    6/2012
WO       2016003430 A1    1/2016

OTHER PUBLICATIONS

Jin et al., "An Analytical Model of Multihop Connectivity of Inter-Vehicle Communication Systems", IEEE Transactions on wireless communications, vol. 9, No. 1, Jan. 2010, © 2010 IEEE, 7 pages.
(Continued)

*Primary Examiner* — Habte Mered
(74) *Attorney, Agent, or Firm* — Steven F. McDaniel

(57) ABSTRACT

As disclosed herein a method, executed by a computer, includes monitoring proximate automobiles using a camera, receiving a request to transmit a communication connection request to a selected automobile, and determining observed attributes corresponding to the selected automobile based on images from the camera. The method further includes broadcasting, over a network, the observed attributes to the proximate automobiles, and requesting disclosed attributes and a connection identifier from the proximate automobiles that match the observed attributes, receiving at least one response from the proximate automobiles that match the observed attributes, and determining which response is a best match to the selected automobile. The method further includes transmitting the communication connection request to the selected automobile over the network using the connection identifier corresponding to the best match. A computer program product corresponding to the above method is also disclosed herein.

16 Claims, 5 Drawing Sheets

(51) Int. Cl.
*G06K 9/32* (2006.01)
*H04W 4/80* (2018.01)

(58) Field of Classification Search
CPC ... B60R 11/04; G06F 3/0412; G06K 9/00791; G06K 9/325; H04N 5/225
See application file for complete search history.

(56) References Cited

U.S. PATENT DOCUMENTS

| | | | | |
|---|---|---|---|---|
| 8,307,037 | B2 * | 11/2012 | Bain | G01C 21/26 705/319 |
| 8,345,098 | B2 | 1/2013 | Grigsby et al. | |
| 8,713,121 | B1 * | 4/2014 | Bain | G01C 21/26 705/319 |
| 2011/0121991 | A1 * | 5/2011 | Basir | G08G 1/0962 340/902 |
| 2013/0141578 | A1 * | 6/2013 | Chundrlik, Jr. | H04N 7/181 348/148 |
| 2015/0016823 | A1 * | 1/2015 | Strassenburg-Kleciak | H04W 76/021 398/115 |
| 2015/0052352 | A1 | 2/2015 | Dolev et al. | |
| 2016/0212596 | A1 * | 7/2016 | Brahmi | H04L 67/12 |
| 2016/0247402 | A1 * | 8/2016 | Huang | H04L 67/12 |
| 2016/0277601 | A1 * | 9/2016 | Seymour | H04N 7/181 |
| 2017/0134722 | A1 * | 5/2017 | Okouneva | H04N 17/002 |
| 2017/0236423 | A1 * | 8/2017 | Bowers | G08G 1/166 340/903 |

OTHER PUBLICATIONS

Yee et al., "Image Transmission for Inter-Vehicle Safety Application", Research Journal of Applied Sciences, Engineering and Technology 5(4): 1339-1343, 2013, Department of Electrical, Electronic and Systems Engineering, Universal Kebangsaan Malaysia, Published: Feb. 1, 2013, 5 pages.

* cited by examiner

ENHANCED COMMUNICATION SYSTEM

BACKGROUND

The present invention relates to a communication system, and more particularly to an enhanced communication system for automobiles.

While driving an automobile, drivers in different automobiles (e.g., cars, trucks, recreational vehicles, motorcycles) may wish to communicate with each other. The subject of the communication may involve driving conditions, vehicle conditions, or simply social interaction. Communication between the drivers may be possible if one driver knows the other driver's cell phone number. Users with shortwave or citizen band (CB) radios may have the ability to contact an unknown driver of another automobile, but rather than a private communication with a specific individual, the communication is available for listening and participation by anyone capable of receiving the broadcast.

SUMMARY

As disclosed herein a method, executed by a computer, includes monitoring proximate automobiles using a camera, receiving a request to transmit a communication connection request to a selected automobile, and determining observed attributes corresponding to the selected automobile based on images from the camera. The method further includes broadcasting, over a network, the observed attributes to the proximate automobiles, and requesting disclosed attributes and a connection identifier from the proximate automobiles that match the observed attributes, receiving at least one response from the proximate automobiles that match the observed attributes, and determining which response is a best match to the selected automobile. The method further includes transmitting the communication connection request to the selected automobile over the network using the connection identifier corresponding to the best match. A computer program product corresponding to the above method is also disclosed herein.

As disclosed herein a method, executed by a computer, includes receiving, from a broadcasting automobile, a broadcast comprising observed attributes, determining if the observed attributes describe a receiving automobile, and responding to the broadcast with disclosed attributes and a connection identifier. The method further includes receiving, over a network, a communication connection request from the automobile, and accepting the communication connection request. A computer program product corresponding to the above method is also disclosed herein.

DETAILED DESCRIPTION

When driving an automobile (e.g., car, truck, recreational vehicle, motorcycle), situations may arise when the driver of a first automobile observes a potentially dangerous issue with a nearby second automobile (e.g., a tail light is not working, a headlight is not working, a soft or flat tire, or loose cargo). If the driver of the first automobile does not know the driver of the second automobile, informing the driver of the second automobile of the potentially dangerous issue may be very difficult. If the driver of the first automobile wishes to inform the driver of the second automobile about the potentially dangerous issue, the only option available to the driver of the first automobile may be to: (i) try to catch up to and pull along the side of the second automobile; (ii) attempt to get the attention of the driver of the second automobile; and (iii) yell out the window informing the driver of the potentially dangerous issue. The action of trying to inform the second driver of the potentially dangerous issue may be more distracting and dangerous than the potentially dangerous issue.

In today's highly computerized society, automobiles include technology enabling features such as hands free telephone communication between the drivers of automobiles. However, the technology is only useful if the driver of the first automobile knows the contact information (e.g. telephone number) of the driver of the second automobile. It has been determined that being able to contact the driver of an automobile using observed identifying attributes corresponding to an automobile being driven may enable enhanced communications between unacquainted drivers of automobiles.

Figure 1A:
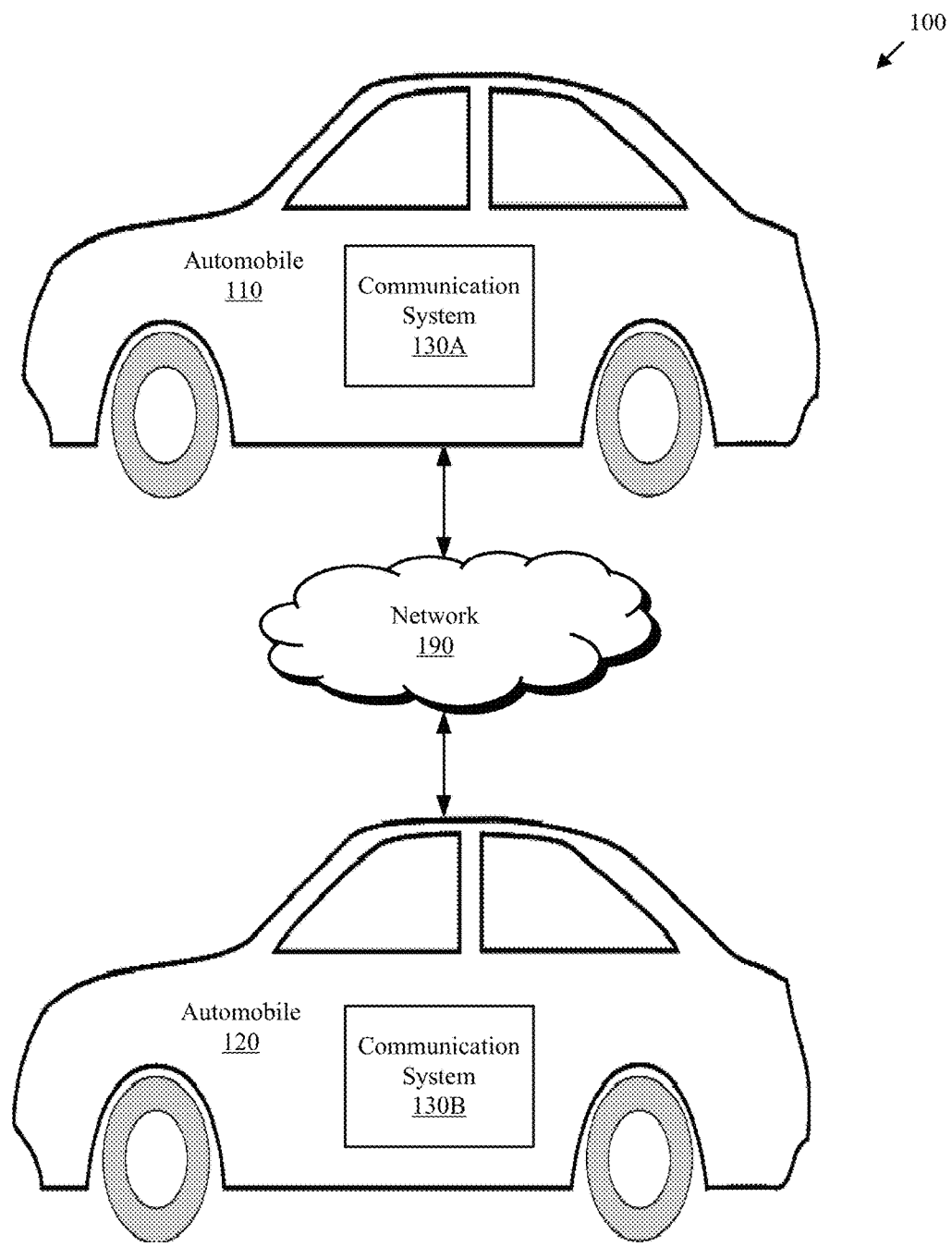
FIG. 1A is a functional block diagram depicting a communication environment, in accordance with at least one embodiment of the present invention.

The present invention will now be described in detail with reference to the Figures. FIG. 1A is a functional block diagram depicting a communication environment 100, in accordance with an embodiment of the present invention. Communication environment 100 includes automobile 110 and automobile 120 which may include cars, trucks, busses, recreational vehicles, motorcycles, or any other form of motorized transportation, known in the art, capable of communicating over network 190. Automobile 110 includes communication system 130A and automobile 120 includes communication system 130B. Communication systems 130A and 130B are computing devices that enable automobiles 110 and 120 to communicate with each other over network 190. Communication system 130 can include smart phones, tablets, laptop computers, specialized computers such as carputers, or any other computer systems, known in the art, capable of communicating over network 190. In general, communication system 130 is representative of any electronic device, or combination of electronic devices, capable of executing machine-readable program instructions, as described in greater detail with regard to FIG. 4.

Communication systems 130A and 130B, and other electronic devices (not shown) communicate over network 190. Network 190 can be, for example, a connection over wifi, cellular telephone, Bluetooth, dedicated short-range communication (DSRC), vehicle-to-vehicle (V2V) communication or a combination there of. In general, network 190 can be any combination of connections and protocols that will support communications between communication system 130A and communication system 130B in accordance with an embodiment of the present invention.

Figure 1B:
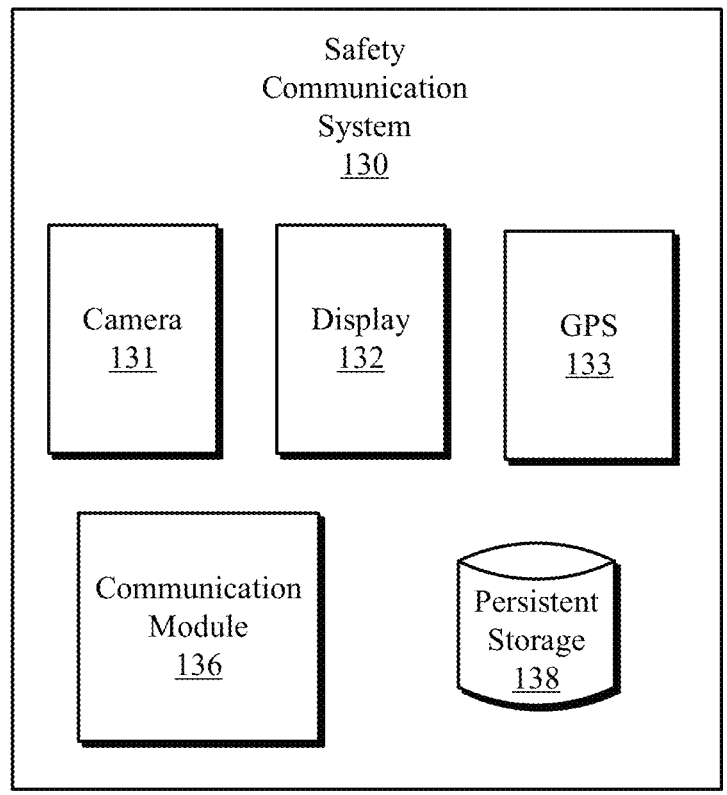
FIG. 1B is a functional block diagram depicting a communication system, in accordance with at least one embodiment of the present invention.

FIG. 1B is a functional block diagram depicting communication system 130, in accordance with at least one embodiment of the present invention. Communication system 130 includes camera 131, display 132, global positioning system (GPS) 133, communication module 136, and persistent storage 138. Communication system 130 may be installed on an automobile, enabling the driver of the automobile to communicate with a driver of a second automobile without knowing the driver of the second automobile.

Camera 131 may be mounted on the interior or exterior of the automobile to capture video images of the surroundings proximate to the automobile (e.g., other automobiles, buildings, and landmarks). In some embodiments, camera 131 captures video images in front of automobile. In other embodiments, camera 131 captures video images in a 360 degree field of view from the perspective of the automobile. In another embodiment, camera 131 captures still images in a 360 degree field of view from the perspective of the automobile. Camera 131 may store video and still image captures on persistent storage 138.

The video images may be continually visible to the driver of the automobile on display 132. Display 132 may be a dash mounted (e.g., built in) display, a portable display (e.g., a tablet or smart phone) or any other display capable of presenting the video images to the driver and communicating with communication module 136. In some embodiments, display 132 is a touch screen display. In other embodiments, display 132 is a dash mounted display dedicated to communication system 130. In some other embodiments, display 132 is a dash mounted display shared by other electronic features of the automobile (e.g., entertainment system, GPS 133, and comfort control system).

Global positioning system (GPS) 133 may be used to identify the location of the automobile or other nearby objects (i.e., automobiles, buildings, or landmarks). In some embodiments, GPS 133 is part of a factory installed automotive navigation system that communicates with communication system 130. In other embodiments, GPS 133 is a hand-held GPS device that communicates with communication system 130. In some other embodiments, GPS 133 is an add-on GPS device that is permanently attached to the automobile.

Communication system 130 may enable the driver of a first automobile (a first driver) to communicate with a driver of a second automobile (a second driver) without knowing the second driver. The first driver may notice a safety issue corresponding to the second automobile (e.g., a tail light is not working), and the first driver wishes to communicate with the second driver to inform the second driver of the safety issue. The first driver may touch the image of the second automobile on display 132. Touching display 132 may indicate, to communication module 136, that a communication connection is being requested.

Communication module 136 may be configured to initiate an outgoing communication with a nearby automobile. The operation of initiating an outgoing communication will be described in greater detail with regard to FIG. 2. Communication module 136 may also be configured to accept an incoming communication request from a nearby automobile. The operation of accepting an incoming communication request will be described in greater detail with regard to FIG. 3.

Persistent storage 138 may be any non-volatile storage media known in the art. For example, persistent storage 138 can be implemented with a tape library, optical library, one or more independent hard disk drives, or multiple hard disk drives in a redundant array of independent disks (RAID). Similarly, data on persistent storage 138 may conform to any suitable storage architecture known in the art, such as a file, a relational database, an object-oriented database, and/or one or more tables.

Figure 2:
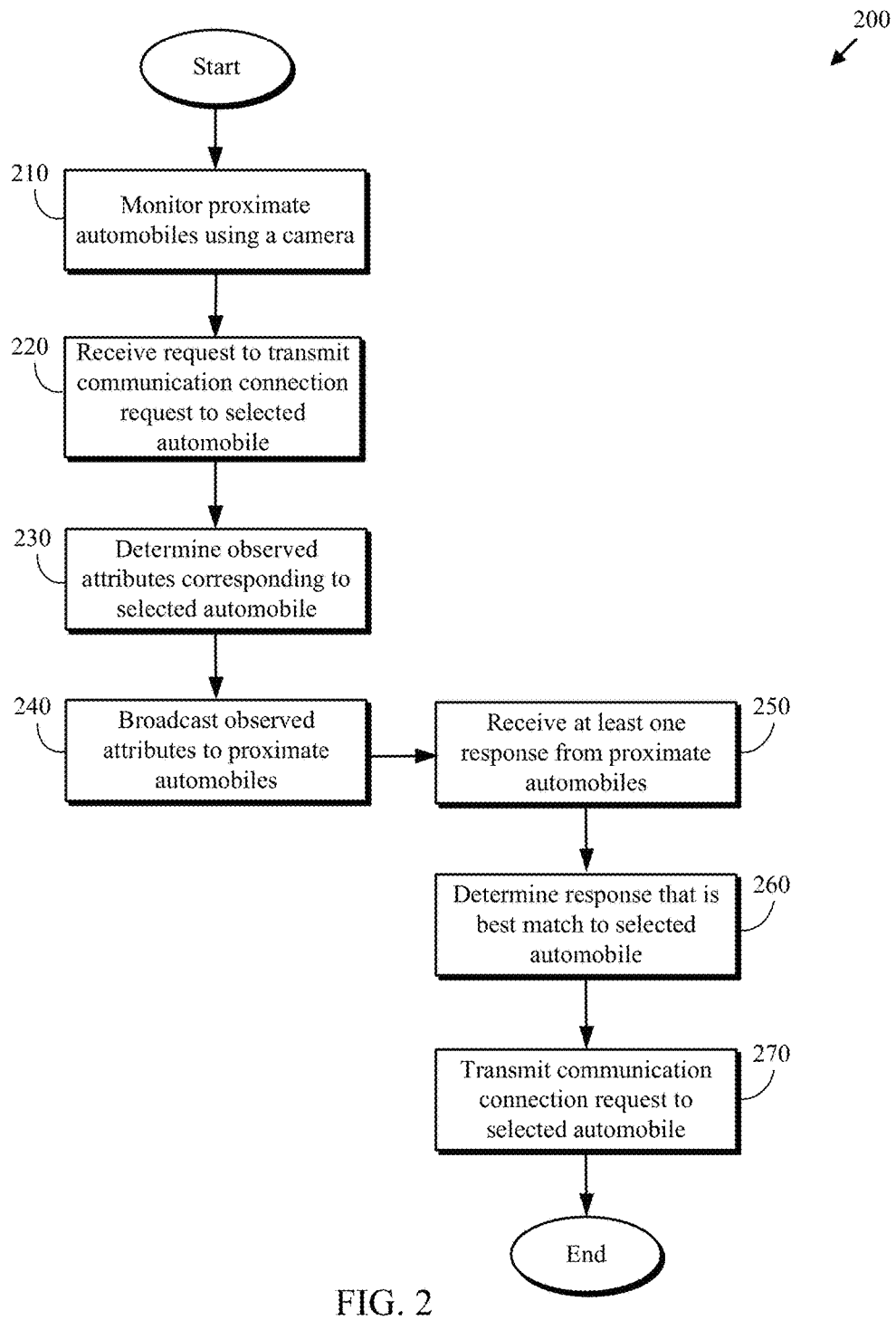
FIG. 2 is a flowchart depicting a communication request method, in accordance with at least one embodiment of the present invention.

FIG. 2 is a flowchart depicting a communication request method 200, in accordance with at least one embodiment of the present invention. As depicted, communication request method 200 includes monitoring proximate automobiles using a camera (210), receiving a request to initiate a communication connection (220), determining observed attributes (230), broadcasting the observed attributes to nearby automobiles (240), receiving at least one response from the nearby automobiles (250), determining which response is a best match (260), and initiating the communication connection (270). Communication request method 200 enables a driver of a first automobile to initiate a communication connection with an unfamiliar driver of a second automobile.

Monitoring proximate automobiles using a camera (210) may include communication module 136 continually receiving images of the nearby surroundings from camera 131. In some embodiments, all images are stored on persistent storage 138. In other embodiments, the images are scanned to detect the presence of automobiles and only images containing automobiles are stored on persistent storage 138.

Receiving a request to initiate a communication connection (220) may include communication module 136 receiving an indication from display 132 that a connection, corresponding to a selected automobile visible on display 132, is being requested. In some embodiments, display 132 is a touch sensitive display (i.e., a touchscreen display) and an image of the selected automobile was touched on display 132. In other embodiments, communication module 136 recognizes and responds to voice commands and an image of the selected automobile is identified using voice commands. Communication module 136 may also record additional details corresponding to the request, such as, but not limited to, the time the request was initiated, the perspective of the image (e.g., front view, rear view, right side view, or left side view), and the location of the object of interest within the image (e.g., the location touched in the image).

Determining observed attributes (230) may include communication module 136 using the additional details corresponding to the request (e.g., those recorded during the receiving a request operation 220) to retrieve the image corresponding to the request from persistent storage 138 and, using image processing technology, confirm that the location of interest within the image is an automobile. Communication module 136 may analyze the image of the selected automobile to determine (observe) identifying attributes corresponding to the selected automobile. Observed attributes may include, for example, at least some of: (i) GPS coordinates; (ii) automobile type; (iii) automobile make; (iv) automobile model; (v) automobile year; (vi) automobile color; and (vii) license plate information.

Broadcasting the observed attributes to nearby automobiles (240) may include communication module 136 creating a broadcast message that includes the observed attributes corresponding to the selected automobile (e.g., the observed attributed identified in determining operation 230). In addition to the observed attributes, the broadcast message may include a request that any automobile matching the observed attributes respond with a complete list of identifying attributes (disclosed attributes) and a connection identifier that may enable communication module 136 to initialize a communication connection. The connection identifier may be, for example, a phone number, internet address, an internet protocol (IP) address, or any other identifier that enables communication module 136 to initiate a communication connection. The broadcast message may be broadcast over a network (e.g., network 190) to all nearby automobiles.

Receiving at least one response from the nearby automobiles (250) may include communication module 136 collecting all responses to a broadcast message (e.g., the broadcast message of broadcasting operation 240) from automobiles that may match the observed attributes included in the broadcast. Responses may be received from automobiles that have enabled communication system 130. Each response may include a list of disclosed attributes that may uniquely identify the automobile to which the response corresponds. The response may also include a connection identifier corresponding to the responding automobile.

Determining which response is a best match (260) may include communication module 136 analyzing the disclosed attributes of each response by comparing the disclosed attributes with the image of the selected automobile. Some responses may provide a GPS location that is not in the correct location (e.g., the response corresponds to an automobile that is behind the broadcasting automobile, but the selected automobile is located in front of the broadcasting automobile) and therefore response can be disregarded. After all responses are analyzed, communication module 136 may select the best (most probable) match. In some embodiments, if the selected automobile is still visible on display 132 (i.e., still in view of the camera), communication module 136 continues to analyze the selected automobile after broadcast operation 240 has completed. Communication module 136 may observe additional attributes after broadcast operation 240 completes, and the additional observed attributes may be used to correctly determine the best match response. If no responses are received, or no responses match the selected automobile, communication module 136 may terminate the communication connection request.

Initiating the communication connection (270) may include communication module 136 obtaining the connection identifier from the response corresponding to the selected automobile, and initiating a communication connection with the selected automobile. After the connection is established, the drivers of the two automobiles may begin to communicate. In some embodiments, the communication is a voice conversation. In other embodiments, the communication may use voice-to-text and text-to-voice technology to send and receive messages. In some other embodiments, an identifying tag (identifying label) is attached to the selected automobile on display 132, and the tag disappears from display 132 when the selected automobile is no longer visible. A tag may include information from the disclosed attributes, such as, the license plate information and automobile make (e.g., NY-AAA-1234-BMW or TX-BBB-5678-AUDI), or automobile make and automobile model (e.g. Chevy-Corvette or Ford-F150).

Figure 3:
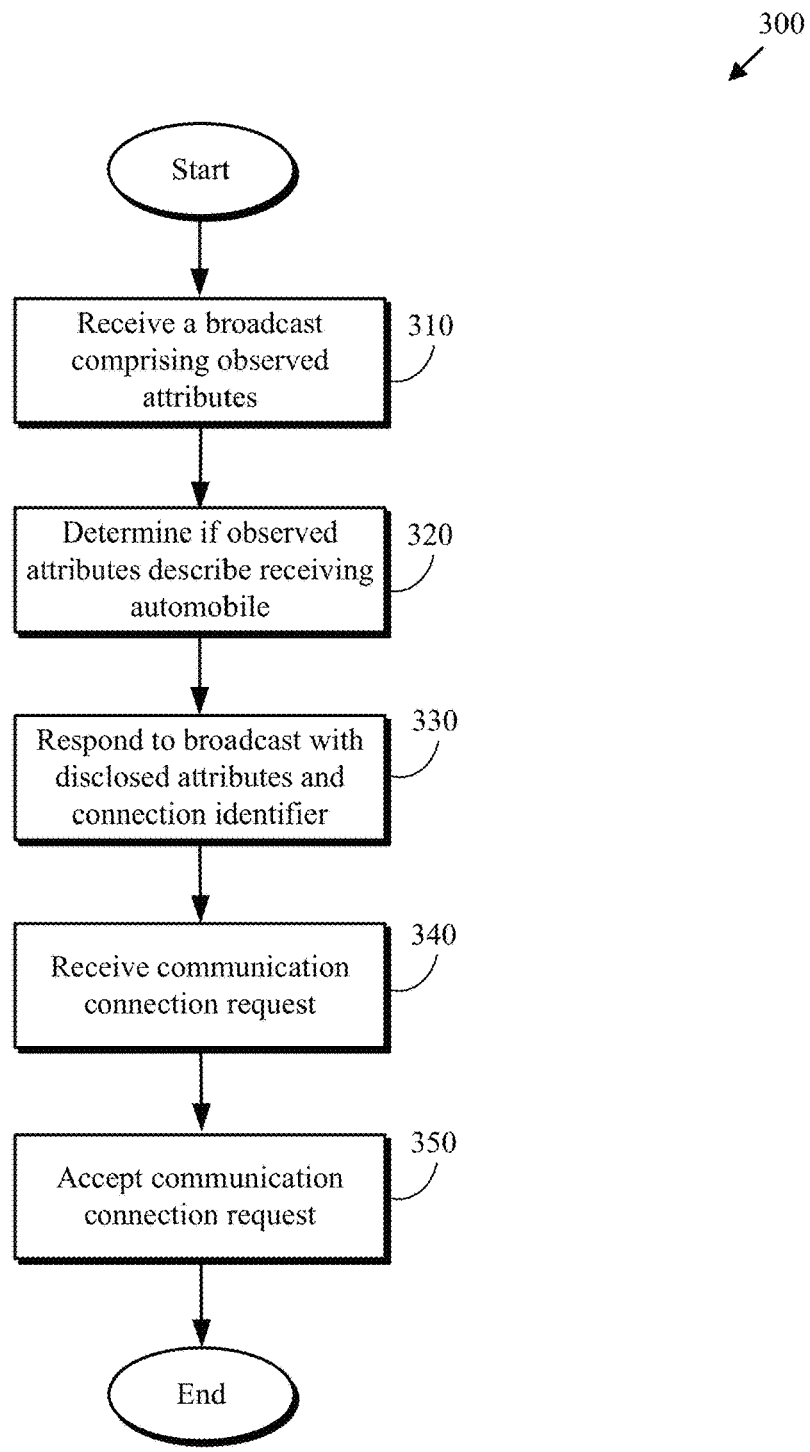
FIG. 3 is a flowchart depicting a communication response method, in accordance with at least one embodiment of the present invention.

FIG. 3 is a flowchart depicting a communication response method 300, in accordance with at least one embodiment of the present invention. Communication response method 300 may include receiving a broadcast (310), determining if the observed attributes are a match (320), responding to the broadcast (330), receiving a communication connection request (340), and accepting the communication connection request (350). Communication response method 300 enables the driver of a second automobile to be receive communications from an unfamiliar driver of a first automobile.

Receiving a broadcast (310) may include communication module 136 receiving, over network 190, a broadcast message from a nearby automobile. The broadcast message may be a message trying to identify and communicate with a specific automobile. The broadcast message may include observed attributes corresponding to a specific selected (observed) automobile. The observed attributes may include, for example, at least some of: (i) GPS coordinates; (ii) automobile type; (iii) automobile make; (iv) automobile model; (v) automobile year; (vi) automobile color; and (vii) license plate information. In addition to the observed attributes, the broadcast message may include a request that any automobile matching the observed attributes respond with a complete list of identifying attributes (disclosed attributes) and a connection identifier.

Determining if the observed attributes are a match (320) may include communication module 136 of the receiving automobile comparing each of the observed attributes from the broadcast message with a list of disclosed attributes corresponding to the receiving automobile. Disclosed attributes may be a collection of identifying attributes that describe an automobile and may uniquely identify the automobile. If all of the observed attributes match the disclosed attributes, then the receiving automobile may be a match. In some embodiments, each observed attribute must match a disclosed attribute for the receiving automobile to be considered a possible match. In other embodiments, a predetermined percentage of observed attributes must match a disclosed attribute for the receiving automobile to be considered a possible match.

Responding to the broadcast (330) may include communication module 136 creating a response to a broadcast message that has been determined to be a match to the receiving automobile. The response may include the list of disclosed attributes, a current GPS location, and a connection identifier. The response may be sent to the requester over network 190.

Receiving a communication connection request (340) may include communication module 136 receiving, from a nearby automobile, a request to establish a communication channel with the requesting (broadcasting) automobile. The request is received as a result of the requester using a connection identifier that corresponds to the receiving automobile. The communication connection request may include disclosed attributes and a connection identifier corresponding to the broadcasting automobile, enabling the broadcasting automobile to be identified on display 132.

Accepting a communication connection request (350) may include communication module 136 acknowledging the request for a communication connection. Communication module 136 corresponding to the receiving automobile and communication module 136 corresponding to the broadcasting automobile may negotiate an agreeable communication protocol and establish a communication with each other. In some embodiments, communication module 136 corresponding to the receiving automobile and communication module 136 corresponding to the broadcasting automobile exchange encryption keys and establish an encrypted communication connection.

Communication module 136 corresponding to the receiving automobile may prompt the driver of the receiving automobile for acceptance of the incoming connection request. In some embodiments, communication module 136 prompts the driver of the receiving automobile via an audio message, and the driver responds to the audio message using a voice command. In other embodiments, communication module 136 prompts the driver of the receiving automobile via a visual prompt (e.g., text message or pictorial message)

on display 132, and the driver acknowledges the message by touching an accept or a decline response that is also visible on display 132.

Communication module 136 corresponding to the receiving automobile may use the disclosed attributes corresponding to the broadcasting automobile to determine if the broadcasting automobile is visible on display 132. In some embodiments, if the broadcasting automobile is visible on display 132, communication module 136 attaches a tag (identifying label) to the image of the broadcasting automobile on display 132. In other embodiments, if the broadcasting automobile is not visible on display 132, communication module 136 presets a tag that identifies the broadcasting automobile in a status area on display 132.

The driver of either automobile may end a communication at any time. In some embodiments, the range of a connection (e.g., the distance over which a connection can exist) is limited and exceeding the range ends a communication. In other embodiments, the tag (identifying label) is removed from display 132 when a communication ends.

Figure 4:
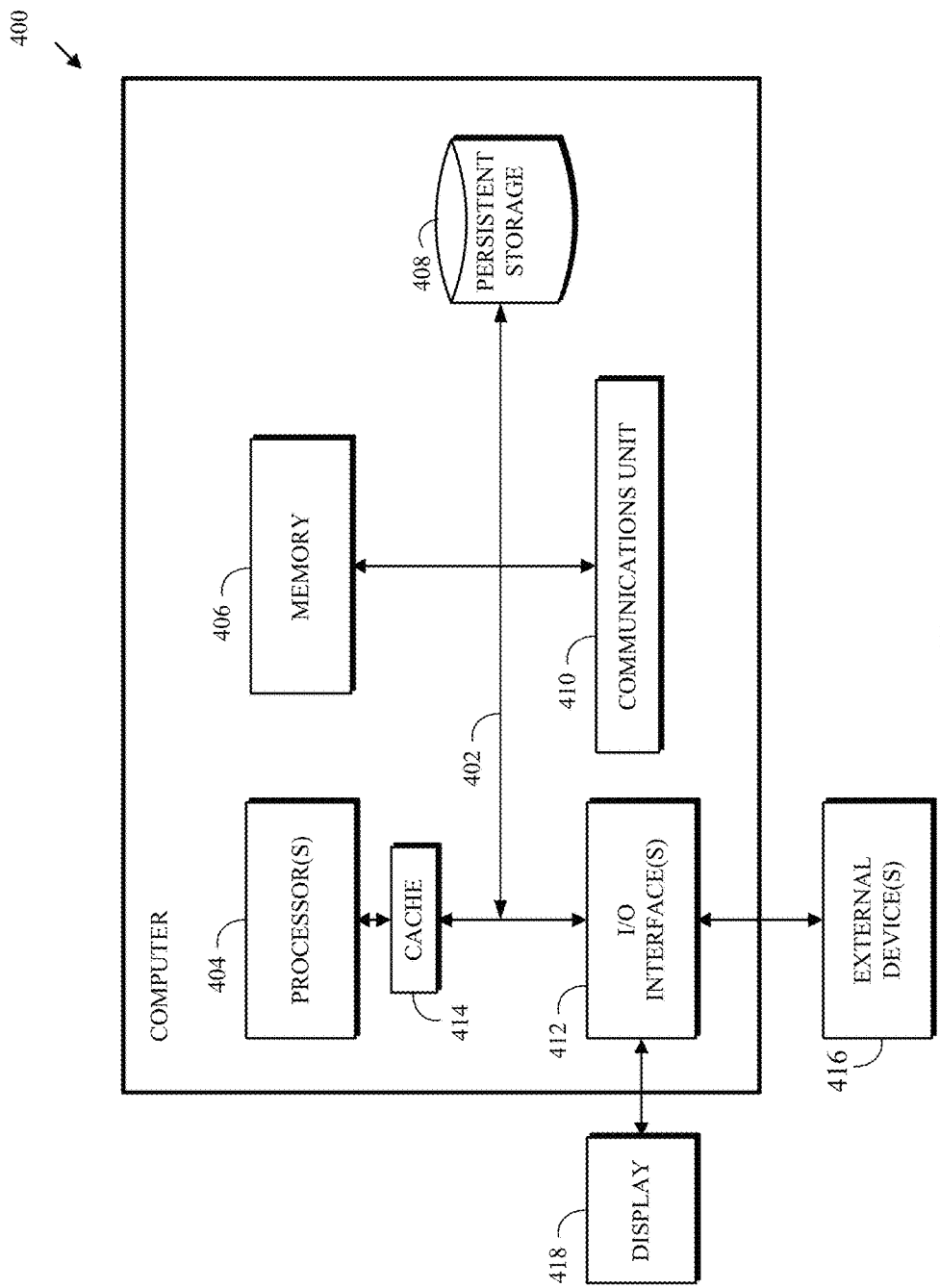
FIG. 4 is a functional block diagram depicting various components of one embodiment of a computer suitable for executing the methods disclosed herein.

FIG. 4 depicts a functional block diagram of components of a computer system 400, which is an example of systems such as communication system 130 within communication environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Communication system 130 includes processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., communication request method 200 and communication response method 300 are stored in persistent storage 408 for execution and/or access by one or more of the respective processor(s) 404 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of communication system 130. In these examples, communications unit 410 includes one or more network interface cards. Communications unit 410 may provide communications through the use of either or both physical and wireless communications links. Program instructions and data used to practice embodiments of communication request method 200 and communication response method 300 may be downloaded to persistent storage 408 through communications unit 410.

I/O interface(s) 412 allows for input and output of data with other devices that may be connected to each computer system. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
monitoring proximate vehicles to a first vehicle using a camera, wherein images from the camera are displayed within the first vehicle on a touchscreen display;
receiving selection of a second vehicle on the touchscreen display, the selection indicating a request to establish a communication connection between the first and the second vehicle;
determining one or more observed attributes corresponding to the second vehicle by analyzing the images from the camera using image processing, wherein the one or more observed attributes include vehicle identifying information;
broadcasting, over a network, from the first vehicle, the one or more observed attributes to the proximate vehicles and requesting the proximate vehicles with at least one matching attribute to the one or more observed attributes respond to the first vehicle with a list of identifying attributes and a connection identifier;
determining, based on at least one response received from the proximate vehicles, a most probable match to the second vehicle by comparing the list of identifying attributes received to the one or more observed attributes; and
initiating the communication connection with the most probable match over the network using the connection identifier received from the most probable match.

2. The method of claim 1, further comprising determining if the second vehicle is still visible on the touchscreen display.

3. The method of claim 2, further comprising, if the second vehicle is still visible on the touchscreen display, determining one or more additional observed attributes.

4. The method of claim 1, wherein the network is one or more of wifi, cellular telephone, Bluetooth, dedicated short-range communication (DSRC), or vehicle-to-vehicle (V2V) communication.

5. The method of claim 1, wherein the list of identifying attributes uniquely identifies each vehicle to which the list corresponds.

6. The method of claim 1, wherein the selection of the second vehicle is received via voice commands from a driver of the first vehicle.

7. A computer program product comprising:
one or more computer readable storage media and program instructions stored on the one or more computer readable storage media, the program instructions comprising instructions to:
monitor proximate vehicles to a first vehicle using a camera, wherein images from the camera are displayed within the first vehicle on a touchscreen display;
receive selection of a second vehicle on the touchscreen display, the selection indicating a request to establish a communication connection between the first and the second vehicle;
determine one or more observed attributes corresponding to the second vehicle by analyzing the images from the camera using image processing, wherein the one or more observed attributes include vehicle identifying information;
broadcast, over a network, from the first vehicle, the one or more observed attributes to the proximate vehicles and requesting the proximate vehicles with at least one matching attribute to the one or more observed attributes respond to the first vehicle with a list of identifying attributes and a connection identifier;
determine, based on at least one response received from the proximate vehicles, a most probable match to the second vehicle by comparing the list of identifying attributes received to the one or more observed attributes; and
initiate the communication connection with the most probable match over the network using the connection identifier received from the most probable match.

8. The computer program product of claim 7, wherein the program instructions comprise instructions to determine if the second vehicle is still visible on the touchscreen display.

9. The computer program product of claim 8, wherein the program instructions comprise instructions, if the second vehicle is still visible on the touchscreen display, to determine one or more additional observed attributes.

10. The computer program product of claim 7, wherein the list of identifying attributes uniquely identifies each vehicle to which the list corresponds.

11. The computer program product of claim 7, wherein wherein the selection of the second vehicle is received via voice commands from a driver of the first vehicle.

12. A computer system comprising:
one or more computer processors;
one or more computer readable storage media;
program instructions stored on the one or more computer-readable storage media for execution by at least one of the one or more computer processors, the program instructions comprising instructions to:
monitor proximate vehicles to a first vehicle using a camera, wherein images from the camera are displayed within the first vehicle on a touchscreen display;
receive selection of a second vehicle on the touchscreen display, the selection indicating a request to establish a communication connection between the first and the second vehicle;
determine one or more observed attributes corresponding to the second vehicle by analyzing the images from the camera using image processing, wherein the one or more observed attributes include vehicle identifying information;
broadcast, over a network, from the first vehicle, the one or more observed attributes to the proximate vehicles and requesting the proximate vehicles with at least one matching attribute to the one or more observed attributes respond to the first vehicle with a list of identifying attributes and a connection identifier;
determine, based on at least one response received from the proximate vehicles, a most probable match to the second vehicle by comparing the list of identifying attributes received to the one or more observed attributes; and
initiate the communication connection with the most probable match over the network using the connection identifier received from the most probable match.

13. The computer system of claim 12, wherein the program instructions comprise instructions to determine if the second vehicle is still visible on the touchscreen display.

14. The computer system of claim 13, wherein the program instructions comprise instructions, if the second vehicle is still visible on the touchscreen display, to determine one or more additional observed attributes.

15. The computer system of claim 12, wherein the list of identifying attributes uniquely identifies each vehicle to which the list corresponds.

16. The computer system of claim 12, wherein the selection of the second vehicle is received via voice commands from a driver of the first vehicle.

* * * * *